US010827168B2

(12) United States Patent
Tran et al.

(10) Patent No.: US 10,827,168 B2
(45) Date of Patent: Nov. 3, 2020

(54) ECHOLOCATE SPECTRUM ANALYZER

(71) Applicant: T-Mobile USA, Inc., Bellevue, WA (US)

(72) Inventors: Antoine T. Tran, Bellevue, WA (US); Emile Tran, Sammamish, WA (US); Daniel Howard Wilson, Puyallup, WA (US); Michael Mitchell, North Bend, WA (US); Jie Hui, Mercer Island, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 122 days.

(21) Appl. No.: 16/175,450

(22) Filed: Oct. 30, 2018

(65) Prior Publication Data

US 2019/0149815 A1 May 16, 2019

Related U.S. Application Data

(60) Provisional application No. 62/587,373, filed on Nov. 16, 2017.

(51) Int. Cl.
| | |
|---|---|
| *H04N 21/438* | (2011.01) |
| *H04N 21/442* | (2011.01) |
| *H04N 21/437* | (2011.01) |
| *H04N 17/00* | (2006.01) |
| *H04N 17/04* | (2006.01) |
| *H04N 21/426* | (2011.01) |
| *H04N 21/61* | (2011.01) |
| *H04N 21/658* | (2011.01) |

(52) U.S. Cl.
CPC ........... *H04N 17/045* (2013.01); *H04N 17/00* (2013.01); *H04N 21/4263* (2013.01); *H04N 21/437* (2013.01); *H04N 21/4382* (2013.01); *H04N 21/4383* (2013.01); *H04N 21/44209* (2013.01); *H04N 21/6112* (2013.01); *H04N 21/6143* (2013.01); *H04N 21/6582* (2013.01)

(58) Field of Classification Search
CPC ....................... H04N 21/437; H04N 21/44209
See application file for complete search history.

(56) References Cited

U.S. PATENT DOCUMENTS 7,110,756 B2 * 9/2006 Diener .................. H04W 16/18
455/423
8,346,163 B2 * 1/2013 Bartlett ................ H04B 7/2606
327/113
(Continued)

*Primary Examiner* — Paulos M Natnael
(74) *Attorney, Agent, or Firm* — Han Santos, PLLC

(57) ABSTRACT

This disclosure describes techniques for capturing radio frequency (RF) signal over the air, processing spectrum power data, and uploading data to a central data repository for analysis and reporting. Captured RF signals are filtered and amplified via a front-end module of a probe that includes a filter and a low noise amplifier (LNA). Output signals can be decoded into digital TV metadata and image captures via a TV tuner and spectrum power, and then analyzed via a software defined radio (SDR). Digital TV metadata and images, as well as SDR data, can be uploaded and collected at a server. The server processes collected spectrum data from SDR into spectrum reports. The server can also analyze collected digital TV metadata to identify with increased accuracy RF sources originating from transmitting TV facilities.

20 Claims, 8 Drawing Sheets

(56) References Cited

U.S. PATENT DOCUMENTS

| | | | |
|---|---|---|---|
| 8,675,781 B2* | 3/2014 | Adnani | H04B 1/006 |
| | | | 375/238 |
| 8,948,801 B2* | 2/2015 | Schmidt | H04W 28/16 |
| | | | 455/450 |
| 9,066,238 B2* | 6/2015 | Stanforth | H04W 72/0466 |
| 2009/0179989 A1* | 7/2009 | Bessone | H04B 17/336 |
| | | | 348/192 |
| 2019/0149815 A1* | 5/2019 | Tran | H04N 21/4263 |
| | | | 725/16 |
| 2020/0137597 A1* | 4/2020 | Segev | H04W 24/08 |

* cited by examiner

ECHOLOCATE SPECTRUM ANALYZER

CROSS-REFERENCE TO RELATED APPLICATIONS

This application claims the benefit of U.S. Provisional Patent Application No. 62/587,393 filed on Nov. 16, 2017, which is hereby incorporated by reference in its entirety.

BACKGROUND

Multiple wireless communications systems may be allocated in close proximity or in the same radio spectrum. As the demand for radio frequency (RF) applications increases and spectrum bands are acquired, the radio spectrum becomes crowded. To measure the power of the spectrum of known and unknown signals, spectrum analyzers can be used to measure the magnitude of an input signal versus frequency within the full frequency range of the instrument. Currently, spectrum analyzers primarily provide analog signal processing to decode signals to track interference sources.

However, analog signal processing does not filter signals as accurately, nor does it extract information such as frequency components as easily, as digital signal processing. Thus, utilizing analog signal processing alone does not reliably identify television channels and programs, particularly since most spectrum users comprise television (TV) broadcasters and most TV broadcasters provide digital television.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
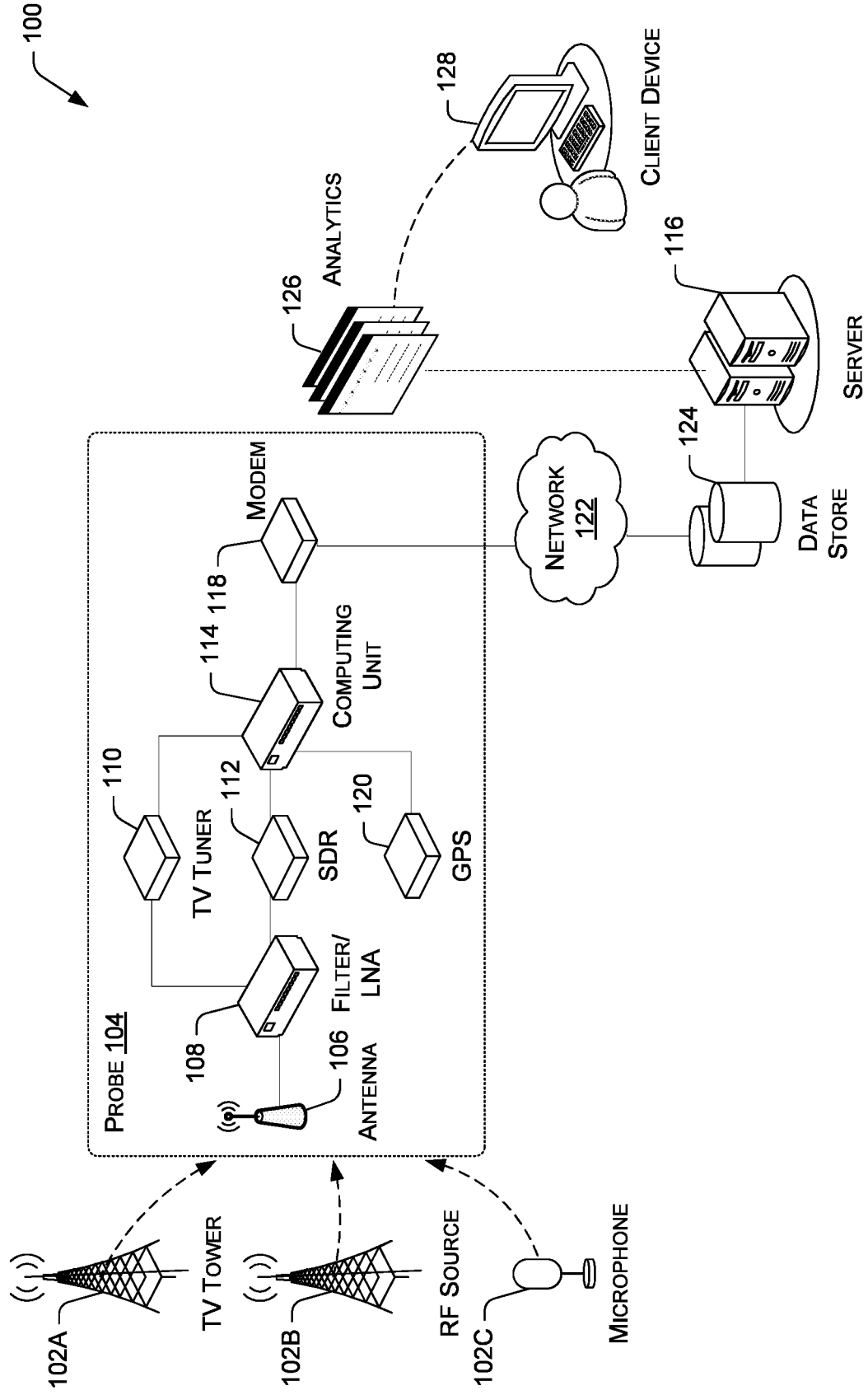
FIG. 1 illustrates example architecture for processing captured RF signals from various RF sources to conduct spectrum analysis and reporting.

This disclosure is directed to techniques for measuring input signals and analyzing TV spectrum to facilitate spectrum clearing. During spectrum clearing, clearing a dedicated spectrum can be a complex process, as legacy, interference-sensitive devices and services that already occupy the spectrum or that are sensitive to transmissions from such spectrum must be identified and removed. In some embodiments, the present system comprises a probe (i.e., a receiver device) that is configured to collect audio and visual signals (e.g., media content) from various RF sources such as TV stations in order to identify spectrum users and conduct analysis for spectrum clearing. Measurements, broadcaster information, broadcasted content information, and/or related data, as well as any analytical data, can be transmitted to a server or a repository. In various embodiments, signals are received at the antenna and are bandpass filtered and amplified using a low noise amplifier at a probe.

The resulting signal can be fed to a tuner (e.g., a digital TV tuner) tuned to the center frequency of the marker source or the carrier frequency at which the oscillator is operating. Thus, all frequencies are removed except those within a small bandwidth surrounding the carrier frequency. The remaining signals can be converted from analog to digital form using, for example, an analog-to-digital converter and the frequency spectrum can be calculated using a spectrum analyzer. Data related to the frequency spectrum can be reported via a reporting agent to the server.

The transport stream carrying media content received at the antenna is streamed to a content presentation device such as a TV (i.e., to obtain the media content) and can be decoded into a decoded transport stream for display on the TV so as to enable capturing of program content on a TV channel, wherein the program content can be captured in a screenshot or a thumbnail format. Captured content (e.g., a screenshot) can be uploaded to the server for analysis, maintained in a log, and/or uploaded to a data store for storage. For instance, screenshots and thumbnails of captured content can be used to verify broadcaster information and broadcaster content.

In various embodiments, the server provides a user interface for displaying a virtual dashboard and tools to present spectral data, such as frequency spectrum and related information obtained from the probes, and for providing spectrum analysis. For example, the dashboard can display a plot of the frequency domain signals from all of the broadcast frequencies received from various RF sources and/or a plot of the frequency and time. Additionally, the user interface can display captured program content and broadcaster information. The user interface can comprise a graphical user interface that is accessible via a client device.

In various embodiments, the location of each of the deployed probe devices can be tracked via GPS using location services. In this regard, each of the probes can be plotted on a map (e.g., an interactive map) and displayed via a user interface. The location or position of each of the probe devices can also be used to identify the location of various RF sources (e.g., TV broadcasters) by analyzing input signals at the probe devices, which enable the server to determine whether TV broadcasters are located or broadcasting in permitted positions and that the TV broadcasters are in compliance with applicable regulations (e.g., Federal Communications Commission (FCC) regulations). Additionally, the RF sources can be identified using a match algorithm. In various embodiments, the location of the broadcasters can also be plotted on a map for display, wherein the location of the broadcasters can be displayed together with the location of the probes as an overlay.

The techniques described herein may be implemented in a number of ways. Example implementations are provided below with reference to the following figures.

Example Architecture

FIG. 1 illustrates example architecture for deploying an onboard spectrum analyzer. The architecture 100 may include a wireless telecommunication network having a probe 104 that is operatively connected to RF sources to receive signals therefrom. In various embodiments, the RF source devices primarily comprise radio masts and towers or broadcast transmitters such as radio transmitters, television transmitter equipment, or television towers 102A. Without limitation, the RF source devices can comprise devices that generate electromagnetic fields of RF ranging from 100 kHz to 300 GHz, and more preferably at approximately 600 MHz, although the range can vary depending upon embodiments. Additionally, the RF source devices 102B can comprise televisions and similar telecommunication media or display devices that receive television signals and reproduce them on a screen.

The RF source devices also include wireless microphones 102C. The wireless microphones 102C can include handheld or body-worn wireless microphones, in-ear monitors, devices used for cueing on-air talent, intercom systems for backstage communications, and/or so forth. The wireless microphones 102C may operate in various spectrum bands. The technical rules under which wireless microphones operate will differ depending on the spectrum band in which they operate. The wireless microphones 102C may be designed to operate on discrete frequencies within a spectrum band, or they may operate over a range of frequencies in a band. In various embodiments, the wireless microphones 102C may use spectrum in the TV bands as well as on other spectrum bands.

The probe 104 receives signals from the one or more RF sources 102A-102C. In this regard, the probe 104 can communicate with the RF sources 102A-102C, wherein the RF sources 102A-102C can transmit data via a communication channel in the network. The probe 104 can be coupled to a TV channel scanner that may comprise one or more antennae 106 in order to receive and/or transmit radio signals over the air, wherein the antennae 106 comprise omnidirectional antennae. The antennae 106 can receive streams in various forms such as National Television Standards Committee (NTSC) or PAL broadcast, and digital forms such as Digital Satellite System (DSS), Digital Broadcast Services (DBS), or Advanced Television Standards Committee (ATSC). DBS, DSS, and ATSC are based on Moving Pictures Experts Group 2 (MPEG2) and MPEG2 Transport standards. MPEG2 transport is a standard for formatting the digital data stream.

In various embodiments, the probe 104 can also include a TV signal meter (e.g., a single channel type and/or a multi-channel type) for measuring an electric field strength of a radio wave received in a TV channel. A spectrum analyzer can also be used for measuring the electric field strength magnitudes of TV channels since it can display the levels of received signals within a certain frequency range. The probe 104 can comprise a front-end module that comprises RF band specific bandpass filters and low noise amplifiers (LNAs) 108. The filter/LNA 108 is configured to span a sufficient bandwidth to receive data of a particular band of data and to receive signals from the antennae to filter out signals in channels adjacent to the communication channel and generate filtered signals. Outputs of the LNAs (i.e., amplified signals) can be processed via a TV tuner 110 and a software-defined radio (SDR) 112 for digital and analog processing.

The TV tuner 110 comprises a reception device configured to receive broadcast program data broadcast by means of a TV broadcast signal and is operatively connected to the antenna 106 or coupled to an aerial, cable, or satellite input (not shown). In various embodiments, the TV tuner 110 can be implemented as a digital TV tuner or ATSC tuner that is capable of receiving digital broadcast program data (e.g., via input signal comprising media content) such as terrestrial digital TV broadcasting and output a respective audio-video data stream. The TV tuner 110 is also configured to capture video data input from an external device in the network, depending upon embodiments.

The analog RF transmission captured from antenna 106 and digitized, for example, by an analog-to-digital converter is processed by the SDR 112 (i.e., executing on a computing unit 114 or one or more processors of the probe 104). The SDR 112 can digitally perform some or all of the operations traditionally performed by analog transmitting and receiving radio circuits, such as mixers, filters, demodulators, etc. The SDR 112 enables tuning and recording of signal information from RF transmissions received from the RF sources 102A-102C.

The probe 104 further comprises a wireless modem 118 such as a long-term evolution (LTE) modem or any other suitable devices for facilitating communications between the probe 104 and an access network, or any combination thereof. In an example embodiment, the wireless communication network can comprise an LTE network. The probe 104 further comprises a global positioning system (GPS) 120 or any other suitable locating technologies or positioning systems for enabling location-based services.

The computing unit 114 pre-processes the information received from the TV tuner 110 and SDR 112 into a specific data format for efficient transmission to a server 116 via the LTE modem 118 or other connectivity devices such as WiFi network or other communication apparatus. In various embodiments, the server 116 can be configured to conduct spectrum analysis and generate reports. In this way, a client device 128 can execute a software application to log onto the server 116 and access uploaded data and view reports generated via the server 116. The server 116 may include general-purpose computers, such as desktop computers, tablet computers, laptop computers, servers, or other electronic devices that are capable of receive inputs, process the inputs, and generate output data. In still other embodiments, the server 116 may be virtual computing devices in the form of computing nodes, such as virtual machines and software containers. In various embodiments, a wireless telecommunication carrier that provides the wireless telecommunication network, and/or a third-party entity that is working with the mobile telecommunication carrier may control the server 116. The server 116 may store data in a distributed storage system, in which data may be stored for long periods of time and replicated to guarantee reliability. Accordingly, the server 116 may provide data and processing redundancy, in which data processing and data storage may be scaled in response to demand. Further, in a networked deployment, server 116 may be added or removed without affecting the operational integrity of the spectrum analysis.

Upon the completion of its physical installation, the probe 104 automatically configures itself to the local time zone where it is installed. The time zone information allows the probe 104 to schedule scan matching the local transmission activities (e.g., TV prime time transmission, other theater or venue events). The probe 104 also periodically registers its installation location, installation site, local time zone, identity, and addresses (e.g., IP address) to the server 116 or a dedicated registration server. The client device 128 can then remotely access the probe 104 for managing the probe 104 scanning strategy, updating probe firmware/software, and/or conducting any other administrative or debugging activities.

The server 116 can utilize various analytic tools to prepare reports and provide interactive data visuals via various user interfaces. The user interfaces can provide spectrum analysis and display analytics such as data related frequency spectrum, broadcaster identification, captured content, signal identification, and spectral power analysis. For example, the user interface can display a plot of the frequency domain signals (1D signal) from all of the frequencies received from various RF sources 102A-102C and/or a plot of the frequency and time (waterfall). Additionally, the user interface can display broadcaster identification information (e.g., frequencies, broadcaster information, etc.) and captured content such as a screenshot of a broadcast program. Further, the user interface can display data related to spectrum analytics.

The user interface can also provide a dashboard and/or tools for display. For example, the user interface can comprise a first screen for viewing TV stations located on a map of a predefined geographical area, the first screen featuring digital television (DTV) station on-air status (i.e., transmission detected, not detected when the TV station is within range of a probe but no transmission is detected, or unknown when the TV station is out of range of a probe and no transmission is detected), DTV station details, including screenshots of broadcasted content, and/or so forth. Additionally, the first screen can provide a TV station view that comprises an interactive map for allowing a user to click on a point to filter down to data related to the selected point on the map. In various embodiments, a user can search for a specific geographical area using a search tool in order to view a map of the desired area. The TV station view can also show detailed information for selected or unselected TV stations as well as a list of probes that detect TV transmission signals and filters and/or slicers to narrow down the view. Similarly, the user interface can comprise a probe view for viewing the location of each of the probes in relation to the TV stations. In various embodiments, the user interface can filter the plot display of the TV stations operated or managed by a specific carrier or a mobile network operator.

The user interface can comprise a second screen to track clearing of air space of the desired band, the second screen featuring a view of probe reception status by deployment area (i.e., air space), a view of spectrum power waterfall, and/or a view of DTV station details, including screenshots of broadcasted content. In yet another embodiment, the user interface can comprise a third screen to provide a probe health dashboard for probe monitoring and management, the third screen providing views of dead or decommissioned probes and tracking probe movement (e.g., added/new probes, decommissioned/dead probes, relocated probes, etc.). Thus, the dashboard on the user interface can provide an at-a-glance view of relevant information pertaining to spectrum analysis, RF sources 102A-102C, and probes 104.

The architecture 100 may further include a log or a data store 124 for storing, managing, and maintaining analytics 126 output via the server 116 and/or the probe 104, wherein the data store 124 can comprise cloud-based services. The data store 124 may include various databases for securely storing data and reports related to various TV stations and spectrum (e.g., spectrum data, DTV metadata, DTV screen capture, etc.). Additionally, the data store 124 can include databases for logging events reported via the probes (e.g., probe health status) and/or the server. In various embodiments, the data store 124 can comprise other databases for storing and managing data related to network-related information, regulatory information for networks, and/or so forth.

Further, the data store 124 can include a management module for controlling hardware resources and can manage data processing and storage. Accordingly, the data store 124 can comprise software utilities that facilitate the acquisition, processing, storage, reporting, and analysis of data from multiple data sources. Moreover, the data storage 124 can store data across multiple virtual data storage clusters with redundancy so that the data may be optimized for quick access. The stored data can include analytics, the aggregated and covered data files, data that are generated by the analytic applications, and/or so forth.

Probe Components

Figure 2:
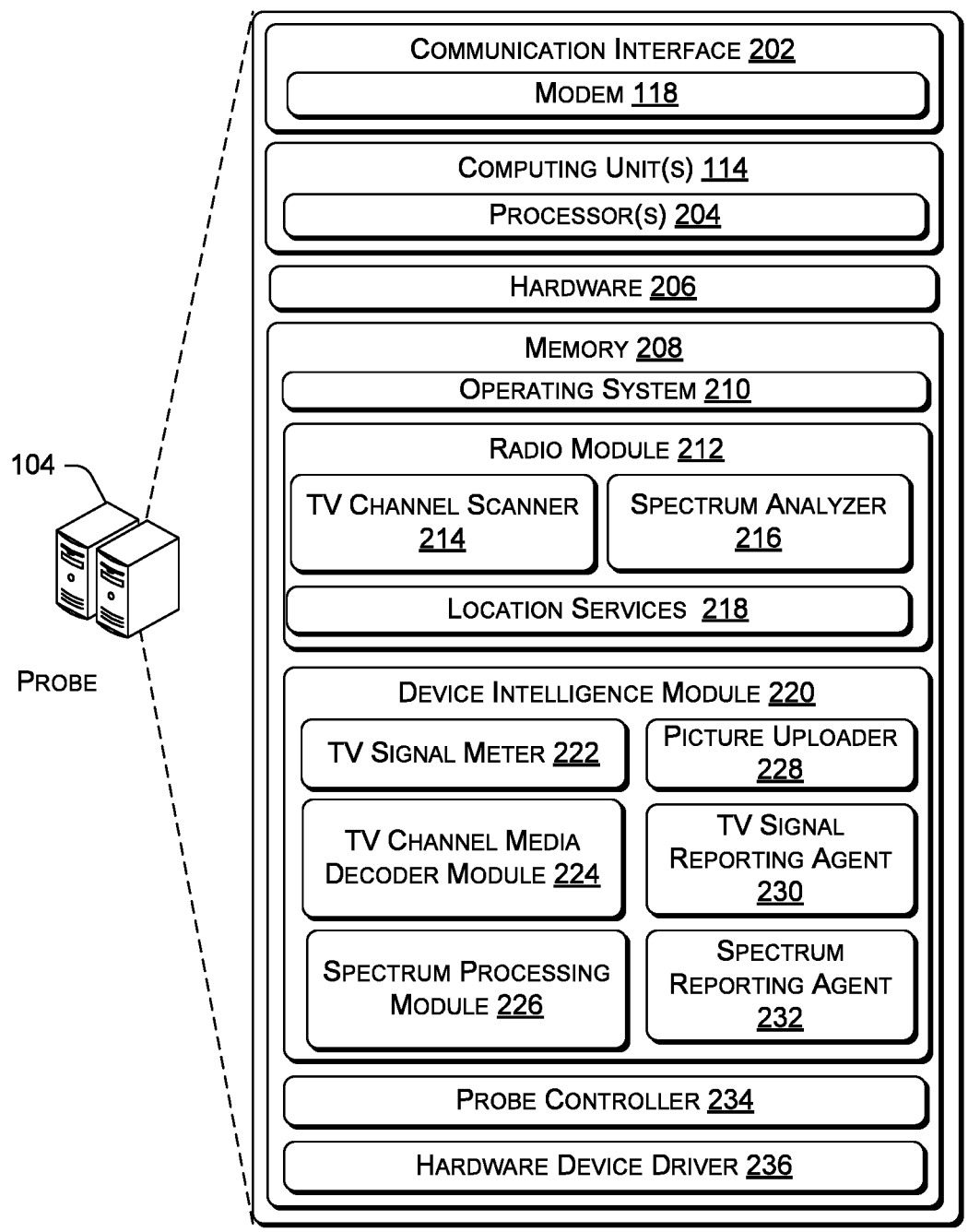
FIG. 2 is a block diagram showing various components of a probe or one or more computing devices that are configured to implement spectrum processing for reporting to a server.
Figure 3:
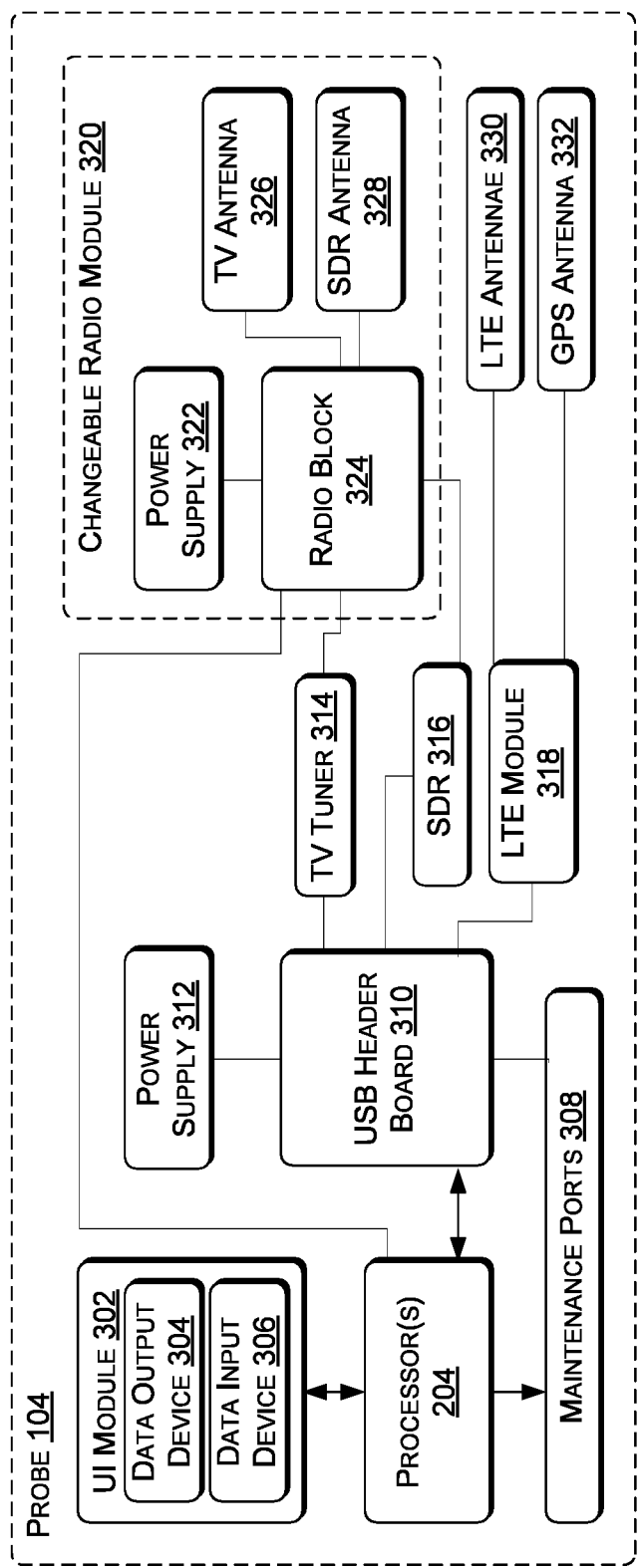
FIG. 3 is a block diagram showing various hardware components of one or more probes that are configured to sense and identify RF sources to implement spectrum processing.

FIGS. 2 and 3 show various components of one or more illustrative probe device(s) that can periodically capture signals over the air, process spectrum power data, and upload data to the central data repository for analysis and reporting. It is noted that the probe device(s) as described herein can operate with more or fewer of the components shown herein. Additionally, the probe device(s) as shown herein or portions thereof can serve as a representation of one or more of the probes of the present system. As shown in FIG. 2, the probe 104 may include a communication interface 202 comprising a modem 118, one or more computing units 114 having one or more processors 204, hardware 206, and a memory unit 208. Turning to FIG. 3, the communication interface 202 may also include wireless and/or wired communication components such as an LTE module 318 that enable the devices to transmit data to and receive data from other networked devices over a fourth-generation mobile communication network such as LTE over LTE antennae 330. In various embodiments, the LTE module 318 is configured to provide connectivity to the LTE network for uploading measurements to the server, provide connectivity to the LTE network for remote operation and maintenance, and provide dial on demand if the LTE connection needs to be disconnected during scanning. Additionally, the LTE module 318 can include a GPS antenna 332.

Referring back to FIG. 2, the hardware 206 may include additional hardware interface, data communication, or data storage hardware (not shown). For example, the hardware interfaces may comprise a user interface (UI) module 302 as shown in FIG. 3 for operating the probe 104, including one or more data output devices 304 and one or more data input devices 306. The data output devices 304 can include a visual display system and/or audio system, wherein the display system can include a screen that can visually depict the operational status of the probe and various subsystems thereof (e.g., TV tuner, spectrum analyzer, LTE module, GPS, etc.) For example, during an installation procedure, the display system can display whether the probe 104 was connected to the network.

The data input devices 306 may include but are not limited to, combinations of one or more of keypads, keyboards, mouse devices, touch screens that accept gestures, microphones, voice or speech recognition devices, and any other suitable devices. Further, the data input devices 306 can include an image sensor such as a camera for capturing still or moving images. The data input devices 306 enable basic user interaction to factory test, install, run self-diagnostic, and conduct a field installation test. The input device can include various communication control devices such as control buttons, keyboard, or keys. The processor 204 can utilize various computing technologies such as a microprocessor and/or digital signal processor (DSP) with associated storage memory such as Flash, ROM, RAM, SRAM, DRAM, or other storage technologies for executing computer instructions, controlling, and processing data supplied by the aforementioned components of the probe 104.

The processor 204 is operatively connected to a USB header board 310 that is configured to allow modular configuration. Additionally, the power switch on each USB port to each peripheral component (e.g., TV tuner 314, SDR 316, LTE module 318) is controllable from the processor 204. The processor 204 can automatically reset any of the peripheral components if they fail to respond to a command, or on a scheduled basis. The operator can remotely issue reset command to peripheral component remotely through a connection via the LTE module 318, via UI module 302 or via the maintenance port 308. The maintenance ports 308 provide access to HDMI display port (i.e., a connection of external display), access to micro SD card(s), access to SIM card(s), access to USB connection(s) (e.g., a connection of external keyboard, mouse, etc.), access to Ethernet connection(s), and/or so forth.

The USB header board 310 also reduces interference among the LTE module 318, the TV tuner 314, the SDR 316 components, and the processor 204. The TV tuner 314 comprises a reception device configured to receive broadcast program data broadcast by means of a TV broadcast signal and is operatively connected to the antenna (e.g., a TV antenna 326, wherein the TV antenna 326 can comprise a UHF TV antenna) for providing omni-directional reception of a desired bandwidth range (e.g., 600 MHz) or a signal of interest. Without limitation, the TV tuner 314 is configured to scan terrestrial (i.e., over the air) ATSC channels, scan terrestrial NTSC analog TV channels, tune in discovered channels to measure signal level and signal to noise ratio, tune in digital channels and stream video, and tune in an analog channel and convert to digital MPEG stream. In various embodiments, the TV tuner 314 can comprise a digital TV tuner for receiving digital broadcast program data. The SDR 316 is configured to measure signal and scan spectrum for spectrum occupancy detection. The SDR 316 enables tuning, playback, recording of RF transmissions. The processor 204 can further decode and record the content (e.g., multimedia, or other digital information) of the RF transmissions recorded from the SDR 316.

The TV tuner 314 and the SDR 316 are operatively connected to a radio block 324 of a changeable radio module 320, wherein the radio block 324 can comprise a front-end module having a filter module and an LNA. In this regard, the radio block 324 is configured to conduct remote configuration functions, provide signal receiver selection to allow for use of a single antenna, filter bandwidth via the filter module to avoid the saturation of the TV tuner 314 (i.e., due to the adjacency to a 700 MHz transmitting base station), etc. Further, the radio block 324 is configured to amplify signals via the LNA to increase the ability to receive signals from TV stations, for example, by scanning for weaker signal sources. It is noted that signal amplification is not required for SDR receiver that has an integrated LNA, however. Additional RF protection may be needed in band 71 (downlink) in the case of a collocated base station start service in band 71. Additionally, the radio block 324 is configured to measure noise and conduct calibration switching. The radio block 324 is further connected to a TV antenna 326 (e.g., a UHF antenna configured to provide omni-directional reception of 600 MHz) and SDR antenna 328, thereby providing connection to the TV tuner 314 and the SDR 316, respectively.

The probe 104 further comprises one or more power supplies 312, 322. The power supply 312, 322 can utilize common power management technologies such as replaceable batteries, supply regulation technologies, and charging system technologies for supplying energy to the components of the probe 104 to facilitate long-range and/or short-range mobility applications. Alternatively, or in combination, the charging system can utilize external power sources such as DC power supplied over a physical interface such as a USB port or other suitable tethering technologies.

Turning back to FIG. 2, the memory unit 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or another transmission mechanism.

The processor 204 and the memory unit 208 may implement an operating system 210. In turn, the operating system 210 may provide an execution environment for a radio module 212, a device intelligence module 220, a probe controller 234, and a hardware device driver 236. The radio module 212 comprises a TV channel scanner 214, a spectrum analyzer 216, and location services 218. The device intelligence module 220 comprises a TV signal meter 222, a TV channel media decoder module 224 to capture a screenshot, a spectrum processing module 226, a picture uploader 228, a TV signal reporting agent 230, and a spectrum reporting agent 232. Additional details of these components are discussed below with respect to FIG. 5.

Example Computing Device Components

Figure 4:
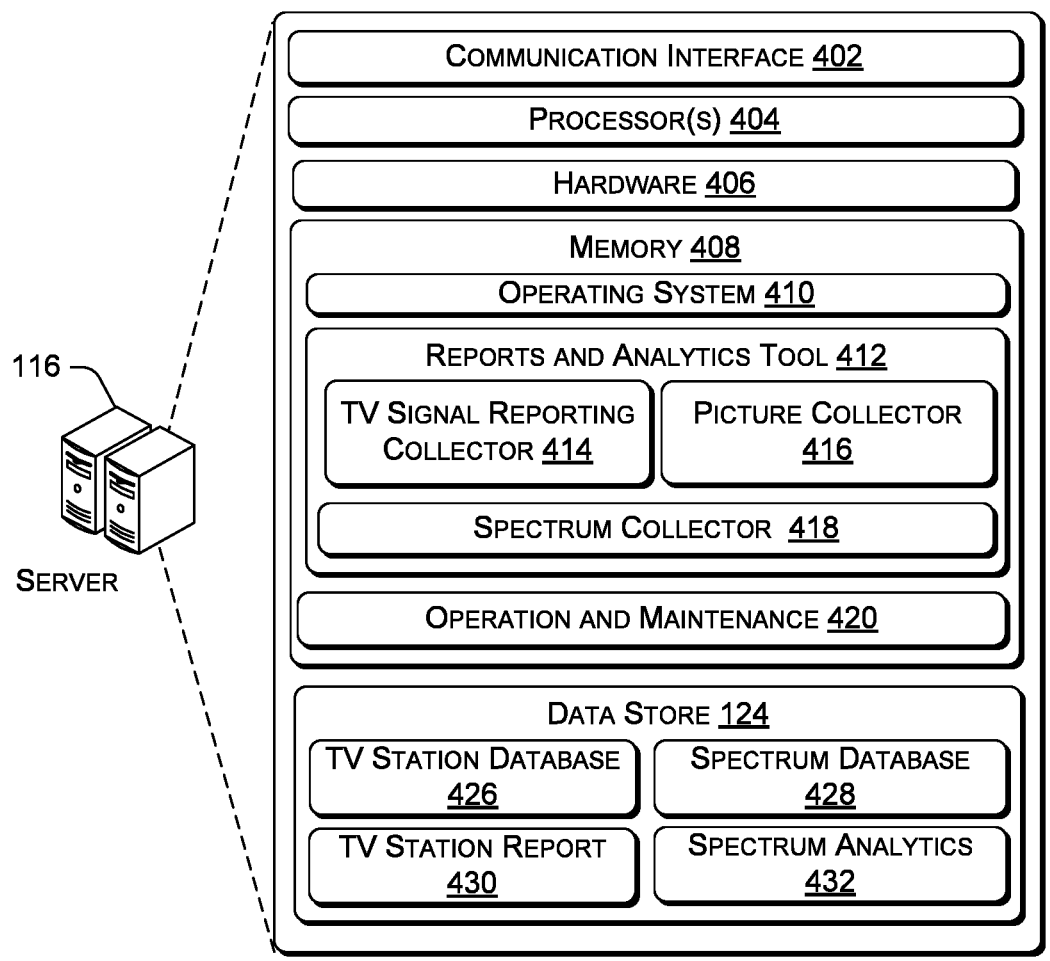
FIG. 4 is a block diagram showing various components of a server or one or more computing devices that are configured to conduct spectrum analysis and reporting.

FIG. 4 is a block diagram showing various components of one or more illustrative computing devices comprising a server that implements data collection and reporting. The server 116 is in communication with the probe and a client device, wherein the client device enables a user of the present system to receive data and send data to the server. The server 116 may include a communication interface 402, one or more processors 404, hardware 406, and a memory unit 408. The communication interface 402 may include wireless and/or wired communication components that enable the server 116 to transmit data to and receive data from other networked devices. The hardware 406 may include additional hardware interface, data communication, or data storage hardware. For example, the hardware interfaces may include a data output device (e.g., visual display, audio speakers), and one or more data input devices (e.g., keypads, keyboards, mouse devices, touch screens that accept gestures, microphones, voice or speech recognition devices, etc.).

The memory unit 408 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or another transmission mechanism.

The processor 404 and the memory unit 408 may implement an operating system 410. In an example embodiment, the operating system 410 can comprise Linux kernel 2.6 and above, Target kernel 4.9 running on Raspberry Pi 3 Raspbian (Debian). The operating system 410 may provide an execution environment for a reports and analytics tool 412 and a data store 124. The reports and analytics tool 412 comprises a TV signal reporting collector 414, a picture collector 416, and a spectrum collector 418. The data store 424 comprises a TV station database 426, a spectrum database 428, a TV station report 430, and spectrum analytics 432. Additional details of these components of the server 116 are discussed below with respect to FIG. 5.

Additionally, the operating system 410 may include other components that perform various additional functions generally associated with an operating system. For example, the operating system 410 may include components that enable the server 116 to receive and transmit data via various interfaces (e.g., user controls, a communication interface, and/or memory input/output devices), as well as process data using the processors 404 to generate output. The operating system 410 may include a presentation component that presents the output (e.g., display the data on an electronic display, store the data in memory, transmit the data to another electronic device, etc.).

Data Flow

Figure 5:
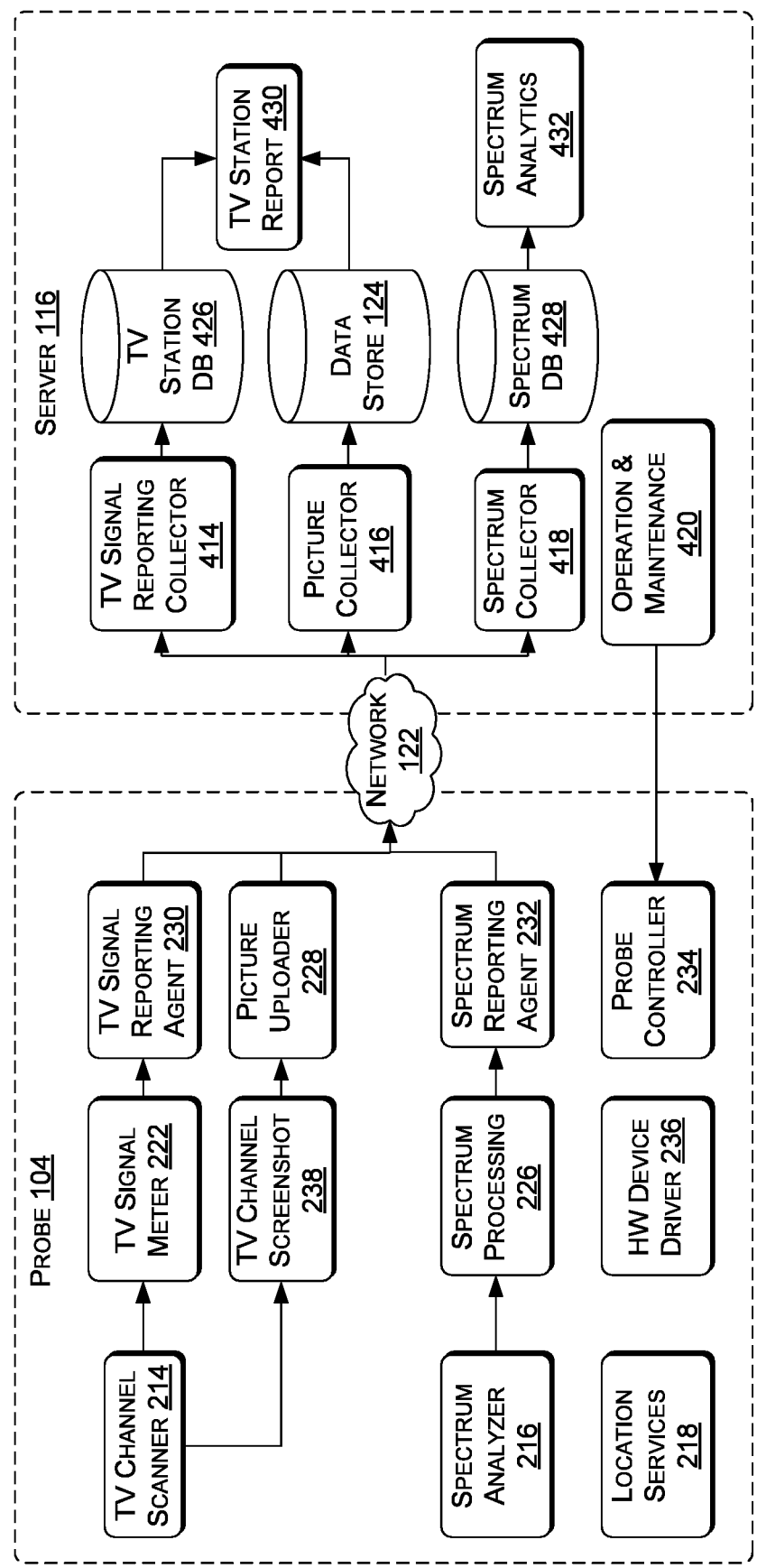
FIG. 5 is an example flow diagram of functional modules of a probe and a server device for conducting spectrum analysis.

FIG. 5 presents a data flow between a probe 104 and a server 116, wherein the probe 104 and the server 116 are in communication in the network 122. The probe 104 comprises a TV channel scanner 214, a spectrum analyzer 216, and location services 218 that can determine the location and time zone of the probe 104 via a GPS module that is integral to the probe 104. The probe 104 further comprises a TV signal meter 222 and a TV channel media decoder module 224 that are operatively connected to the TV channel scanner 214, the TV channel media decoder module 224 configured to capture a screenshot 238 or a thumbnail of a displayed image on TV channels. In various embodiments, the TV channel scanner 214 captures channels central frequency, call sign, relative signal quality, a screenshot for each TV program detected, low and high gain, short spectrum scan for signal measurement, and/or so forth. The TV channel scanner 214 can use a frequency selection module to identify channels to scan. Additionally, the TV channel scanner 214 can work in conjunction with tuners (e.g., TV tuners) and/or demodulators. The TV channel scanner 214 can also implement an algorithm that intelligently scans a channel space. For example, the channel scanner algorithm may bias the selection of wideband frequency blocks to encompass specific channels, wherein the wideband frequency block can be a rough multiple of the frequency width of a channel. For example, the wideband frequency block can capture a bandwidth of 600 MHz. Additionally, the TV channel scanner 214 can implement various scanning schemes to automatically conduct scanning at regular intervals or according to a predefined schedule.

The TV signal meter 222 is connected to a TV signal reporting agent 230 for reporting TV signals to the server 116. The TV signal meter 222 is configured to measure and display an electric field strength of a radio wave of each television channel included in very high frequency (VHF) or ultra high frequency (UHF) ranges or the like. The TV channel media decoder module 224 is configured to capture program content on a TV channel. For example, the TV channel media decoder module 224 can capture a screenshot or a thumbnail of displayed images. Captured content (e.g., a screenshot) can be uploaded to the server 116 via the picture uploader 228 and stored in a data store.

The spectrum analyzer 216 is operatively connected to a spectrum processing module 226 that is further connected to a spectrum reporting agent 232. The spectrum analyzer 216 can be implemented as a dedicated spectrum analyzer or as part of the functions performed by a processor. The spectrum analyzer 216 can include a receiver to receive signals present and a signal processor (e.g., a digital signal processor) to analyze and evaluate the detected signals. The spectrum analyzer 216 determines spectral content of an output of the filter or tuner and the spectral content and measurement are transmitted to the server 116 via the spectrum reporting agent 232. This information can then be used by the server 116 to complete the spectral power analysis and identify broadcasters and capture content. In various embodiments, the spectrum reporting agent 232, the signal reporting agent 230, and the picture uploader 228 can upload data to the server 116, for example, on a scheduled basis.

The probe 104 further comprises a hardware (HW) device driver 236 for controlling operation of various hardware that may be attached to the probe 104. The device driver 236 can provide a software interface to the hardware to enable operating systems and/or other programs to access the hardware functions. The driver 236 can communicate with the probe 104 via a BUS or another suitable communication subsystem. The probe controller 234 communicates with an operation and maintenance module 420 of the server 116, wherein the operation and maintenance module 420 can remotely control functional components of the probe 104. In various embodiments, the operation and maintenance module 420 is configured to automatically coordinate and transmit firmware over-the-air updates to the probe and conduct remote management. Additionally, the operation and maintenance module 420 can monitor the health and/or the status of the probe 104. In this regard, the operation and maintenance module 420 can keep track of the probe's location and other information related to the operation of the probe 104.

The server 116 comprises a TV signal reporting collector 414, a picture collector 416, and a spectrum collector 418, the spectrum collector 418 operatively connected to the spectrum database 428 for storing spectrum analytics 432. The TV signal reporting collector 414 is communicatively coupled to a TV station database 426. The TV station database 426 stores information related to broadcaster identification, such as digital channel number and program identification for digital television and analog channel number for analog television. Additionally, the TV station database 426 can comprise information related to broadcaster identification for wireless microphones.

The picture collector 416 is operatively connected to a data store 124 (e.g., Amazon S3) that can be dedicated to logging captured content such as screenshots of broadcast programs on television. Captured content can be compared to broadcaster information in order to verify that the correct captured content is associated with a broadcaster. In various embodiments, captured content can comprise audio content (e.g., if the RF source comprises a wireless microphone) as well as visual content. In various embodiments, TV signal reporting collector 414, the picture collector 416, and the spectrum collector 418 of the server 116 are configured to periodically check for and retrieve newly available data from the probe 104.

The data that is stored in the TV station database 426 and the data store 124 can be managed and made accessible via the TV station report module 430, wherein the TV station report module 430 can generate a report comprising frequency spectrum and related data such as information related to TV stations and captured content. For example, the reports can comprise detailed information for TV stations, a list of probes that detect TV transmission signals, TV station on-air status, positions of TV stations and probes, and/or so forth. Additionally, the station report module 430 can display the reports on a virtual dashboard via a user interface at the server 116 and/or a client device.

Example Processes

Figure 6:
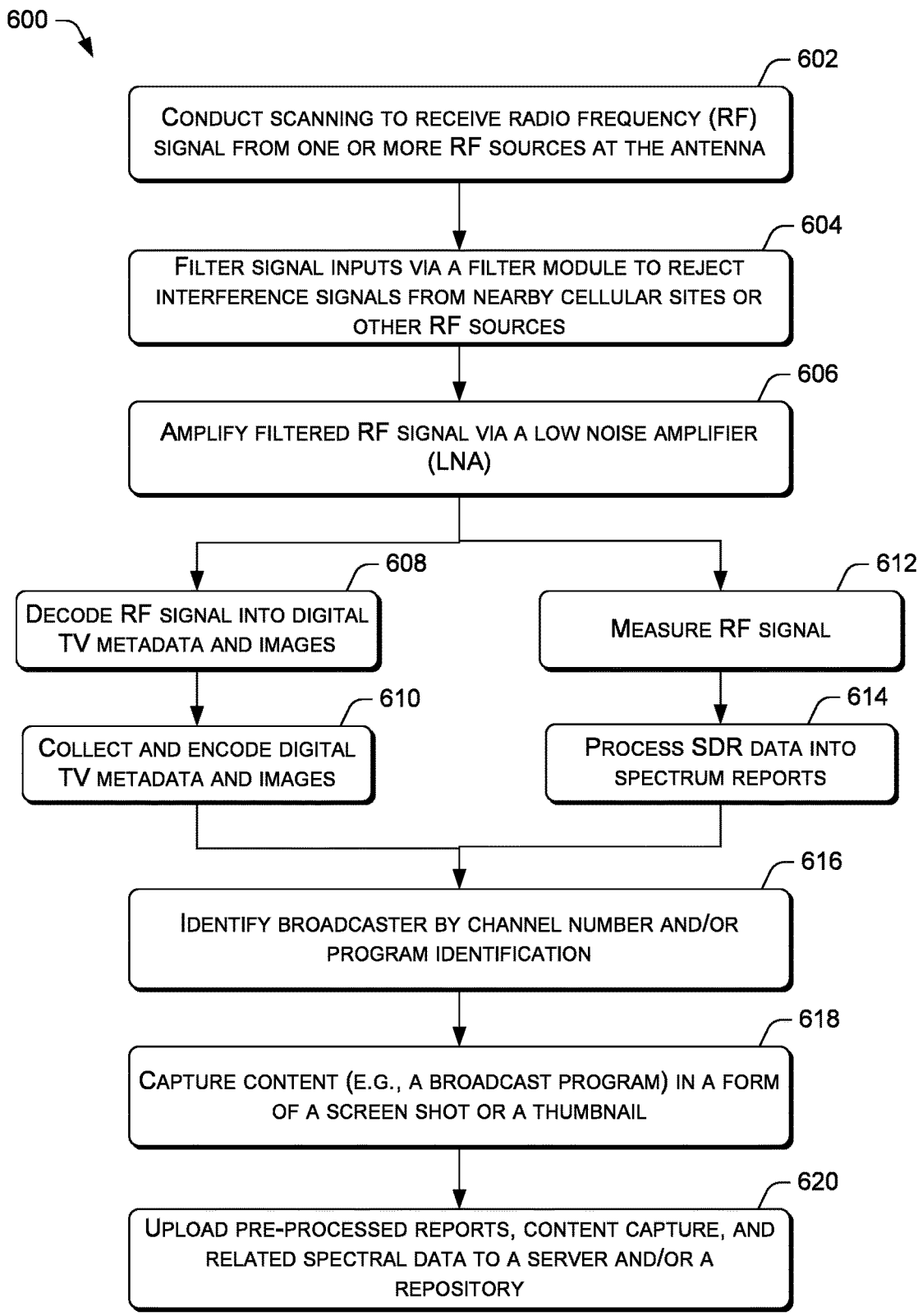
FIG. 6 is a flow diagram of an example process for implementing spectrum analysis.
Figure 7:
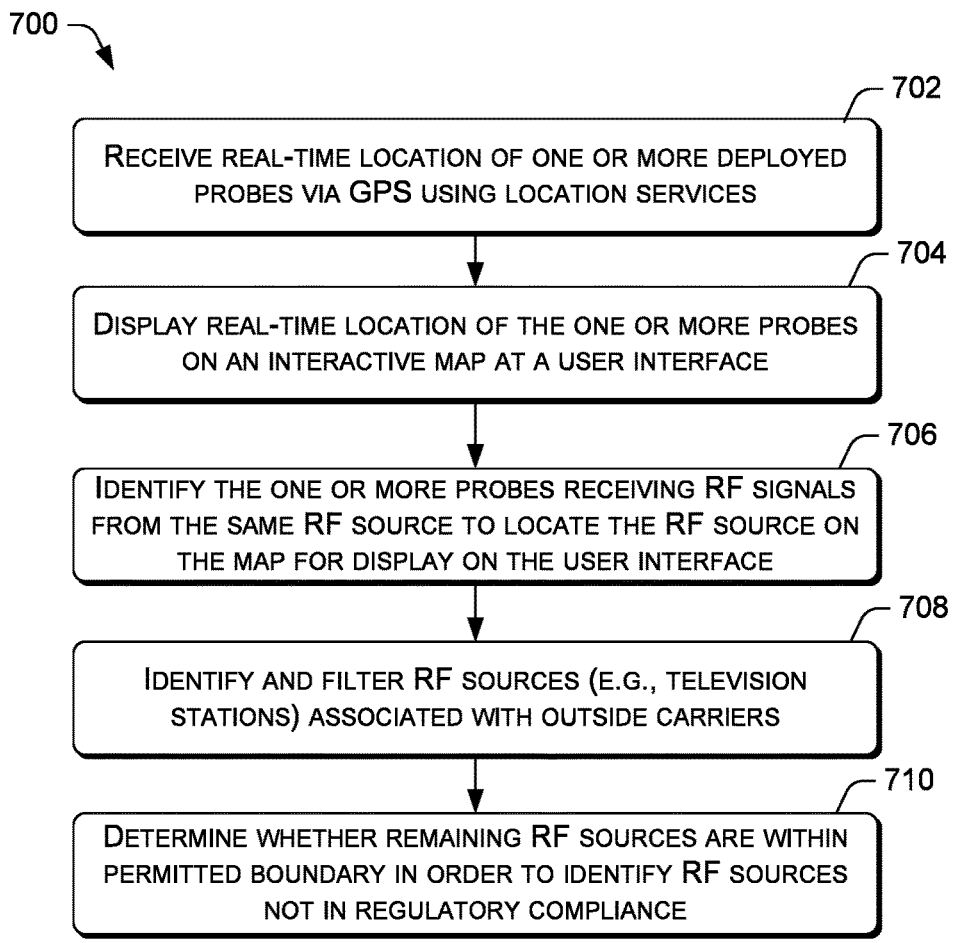
FIG. 7 is a flow diagram of an example process for determining TV station location.
Figure 8:
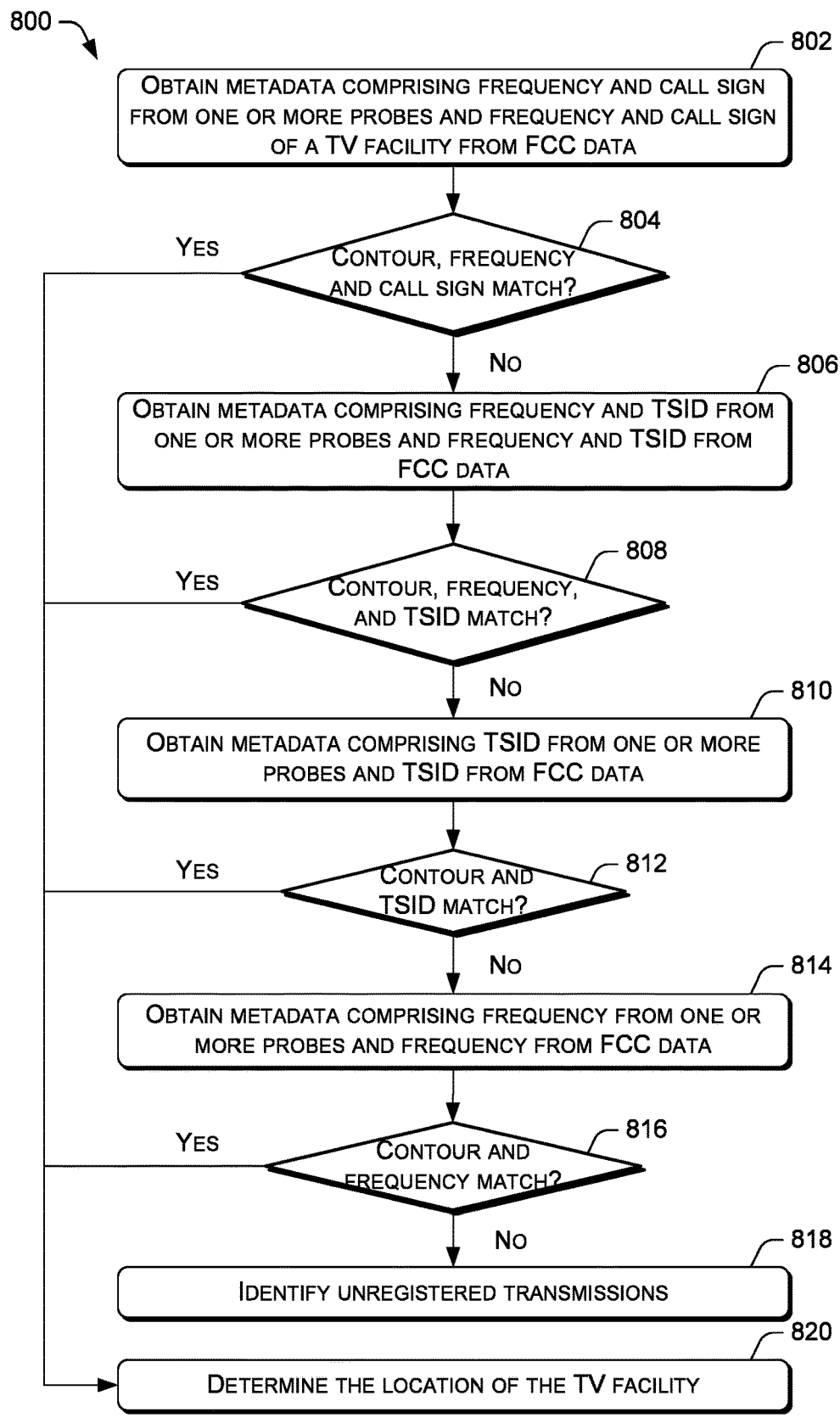
FIG. 8 is a flow diagram of an example process for determining a multi-layer match.

FIGS. 6-8 present illustrative processes 600-800 for using a probe device and a central server to collect signals and conduct spectrum analysis. Each of the processes 600-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600-800 are generally described with reference to the architecture 100 of FIG. 1 and the system components as depicted in FIGS. 2 through 5.

FIG. 6 is a flow diagram of an example process 600 for receiving signals from various RF sources and processing the signals to conduct spectrum analysis from the perspective of the probe. At block 602, the signals are received at the antenna of a probe device from one or more RF sources, wherein the one or more RF sources can comprise TV stations, wireless microphones, and/or so forth. The antenna can comprise an omnidirectional antenna and can be programmed to intelligently scan a predefined channel space. At block 604, the filter module of the probe device can reject interference signals from nearby cellular sites or other RF sources so that the remaining signals comprise signals at the desired bandwidth range. At block 606, the LNA of the probe device amplifies the remaining signals for digital and analog processing via the TV tuner and the SDR integral to the probe. At block 608, the RF signal is decoded into digital TV metadata and image captures via a decoder integral to the TV tuner. Without limitation, digital TV metadata can include frequency, received call sign, transport stream identification (TSID). At block 610, the TV tuner collects and encodes a digital TV metadata and images via an encoder integral thereto. At block 612, the SDR measures the filtered RF signal to calculate the frequency spectrum. At block 614, the SDR processes SDR data into spectrum reports. The digital TV metadata and images and the spectrum reports can be uploaded to a server and/or a data store. In this regard, the computing unit at the probe can pre-process the information received from the TV tuner and the SDR to a specific data format for transmission to the server. It is noted that the operations at block 608 and block 612 can occur concurrently following the operation at block 606. Alternatively, the operations at block 608 and block 612 can occur non-concurrently such that the operation at block 608 can occur before the operation at block 612 and vice versa.

At block 616, the spectrum analyzer identifies a TV broadcaster by channel number and/or program identification. In this way, any unauthorized users of a predefined spectrum range or band can be identified at the server, and the unauthorized users can be requested to vacate the spectrum for spectrum clearing. At block 618, the TV channel scanner via a TV channel media decoder module can capture a screenshot or a thumbnail of a broadcast program to verify program identification and broadcaster information. At block 620, the TV signal reporting agent, the picture uploader, and the spectrum reporting agent upload data comprising reports, captured content, spectral data, and/or other related data to the server and/or a repository such as a data store.

FIG. 7 is a flow diagram of an example process 700 for processing signals and metadata received via one or more probe devices in order to locate RF sources from the perspective of the server. At block 702, the server receives a real-time location of one or more deployed probes via GPS using location services. At block 704, the server can display real-time location information of the one or more probes on an interactive map on the user interface. The map can also show status (e.g., reception status) of each of the probes to allow, for example, a user or an administrator to monitor probe health. In some embodiments, the map can also show locations of decommissioned probes that need to be relocated or that require maintenance services. At block 706, the server identifies the one or more probes receiving RF signals from the same RF source to locate the RF source on the map for display on the user interface. The locations of the probe and the RF sources can be plotted on the same map. For example, the locations of the RF sources can be shown as an overlay. Additionally, detailed information associated with the RF sources (e.g., DTV station details) can be displayed.

At block 708, the server can identify and filter RF sources associated with outside carriers to identify unauthorized users of a predefined spectrum range. In various embodiments, a match algorithm can be implemented to identify RF sources. For instance, the match algorithm can utilize the real-time location of the probes, digital TV metadata (e.g., frequency, received call sign, TSID, etc.), and/or FCC updated list of TV facilities with corresponding frequency, TSID, registered call sign, and location, in order to conduct a two pass multi-layer TV facilities match. The calculation of a TV facility service contour for the probe (TV Facility Service Contour) can be based on a free space propagation model using data provided by the respective TV facility with the FCC. At block 710, the server determines whether remaining RF sources (i.e., permitted users of the predefined spectrum range) are located within a permitted physical boundary in order to identify RF sources not in regulatory compliance (e.g., FCC).

FIG. 8 is a flow diagram of an example process 800 for conducting a multi-layer match using metadata derived from one or more probes and FCC data to identify one or more RF sources such as a TV facility. At block 802, the server can obtain location and metadata comprising frequency and call sign of a TV facility from a probe and the FCC data. If the location obtained from the probe put it within the TV Facility Service Contour and if the frequency and the call sign obtained from the probe match the frequency and the call sign in the FCC data at decision block 804, the server can identify the TV facility and determine the location of the same as indicated in block 820. If the location obtained from the probe does not put it within TV Facility Service Contour, and if the frequency and the call sign obtained from the probe do not match the frequency, nor the call sign in the FCC data ("no" response from the decision block 804), the server obtains location, metadata comprising frequency and TSID from the probes and the FCC data as indicated in block 806. If the location obtained from the probe put it within the TV Facility Service Contour, and if the frequency and the TSID obtained from the probes match the frequency and the TSID in the FCC data at decision block 808, the server can identify the TV facility and determine the location of the same as indicated in block 820. If the location obtained from the probe does not it probe within TV Facility Service Contour, and if the frequency and the TSID obtained from the probe do not match the frequency and the TSID in the FCC data ("no" response from the decision block 808), the server obtains location, metadata comprising TSID from the probes and the FCC data as indicated in block 810. If location obtained from the probe put it within the TV Facility Service Contour and if the TSID obtained from the probes match the TSID in the FCC data at decision block 812, the server can identify the TV facility and determine the location of the same as indicated in block 820. If the location obtained from the probe does not put it with the TV Facility Service Contour, and if the TSID obtained from the probes do not match the TSID in the FCC data ("no" response from the decision block 812), the server obtains location, metadata comprising frequency from the probes and the FCC data as indicated in block 814. If the location obtained from the probe put it within the TV Facility Service Contour and if the frequency obtained from the probes match the frequency in the FCC data at decision block 816, the server can identify the TV facility and determine the location of the same as indicated in block 820. If for the frequency obtained from the probe, none of the matches in block 804, 808, 812 may be made for any TV facility in the FCC data ("no" response from the decision block 816), the server identifies unregistered transmissions as indicated in block 818.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
    a server;
    a probe in communication with the server, the probe comprising: an antenna for detecting radio frequency (RF) activity of one or more RF sources in a network;
    one or more processors;
    a memory unit coupled to the one or more processors, the memory unit including:
        a channel scanner operatively connected to the antenna, the channel scanner executable by the one or more processors to generate a filtered signal based on a desired bandwidth range;
        a spectrum analyzer executable by the one or more processors to determine a spectral content of the filtered signal and calculate a frequency spectrum of the filtered signal;
        a spectrum reporting agent executable by the one or more processors to transmit the spectral content and the frequency spectrum upon receiving a request for a spectrum report from the server and communicate via the server the spectrum report comprising the spectral content and the frequency spectrum to a client device configured to execute a software application; and
        a TV signal meter operatively connected to a TV signal reporting agent executable by the one or more processors and a signal reporting collector of the server, the TV signal reporting agent configured to report a measured strength of the filtered signal to the server to determine whether the one or more RF sources is an authorized user of the desired bandwidth range, and the signal reporting collector configured to request from the probe.

2. The system of claim 1, wherein the memory unit further comprises location services executable by the one or more processors, the location services configured to determine a real-time location of the probe, wherein the real-time location of the probe is reported to the server.

3. The system of claim 1, wherein the memory unit further comprises a TV channel media decoder module executable by the one or more processors, the TV channel media decoder module configured to capture a screenshot of a decoded stream of a broadcast program, wherein the decoded stream is based on the filtered signal.

4. The system of claim 3, the TV channel media decoder module operatively connected to a picture collector of the server, the picture collector configured to request from the probe, the screenshot of the decoded stream of the broadcast program to identify a broadcaster of the broadcast program and determine whether the broadcaster is an authorized user of the desired bandwidth range.

5. The system of claim 1, wherein the memory unit further comprises a probe controller executable by the one or more processors, the probe controller configured to receive firmware updates over the air from an operation and maintenance module of the server.

6. A computer-implemented method, comprising:
    requesting a TV signal report comprising signal strength of input signals received at an antenna of a probe from one or more radio frequency (RF) sources in a network, the input signals filtered based on a desired bandwidth range;
    receiving a real-time location of one or more probes detecting RF activities of the one or more RF sources deployed in a geographical area via location services, each of the one or more probes comprising a global positioning system (GPS);
    identifying the one or more probes receiving RF signals from a same RF source to locate the same RF source;
    determining whether the same RF source is located in a permitted location;
    if the same RF source is located within the permitted location, identifying the same RF source as not in regulatory compliance;
    identifying the one or more RF sources using a match algorithm; and displaying a dashboard on a user interface, the dashboard comprising a map of real-time locations of the one or more RF sources and the one or more probes detecting the RF activities of the one or more RF sources.

7. The computer-implemented method of claim 6, further comprising:
determining whether the same RF source is an authorized user of the desired bandwidth range.

8. The computer-implemented method of claim 6, wherein the one or more RF sources comprises a TV station, further wherein the dashboard further comprises digital television (DTV) station on-air status and DTV station details.

9. The computer-implemented method of claim 6, further comprising:
requesting a screenshot of a decoded stream of a broadcast program, wherein the decoded stream is based on the filtered signal transmitted from the one or more RF sources.

10. The computer-implemented method of claim 9, wherein the dashboard further comprises the screenshot of the broadcast program.

11. The computer-implemented method of claim 9, wherein the screenshot is uploaded to a server to identify a broadcaster associated with the broadcast program.

12. The computer-implemented method of claim 6, wherein the one or more RF sources comprises wireless microphones.

13. The computer-implemented method of claim 6, wherein the one or more RF sources comprises a TV station.

14. The computer-implemented method of claim 6, wherein the user interface displays a spectrum report.

15. The computer-implemented method of claim 6, further comprising" receiving firmware updates over the air (OTA).

16. A system, comprising:
a server;
a probe in communication with the server, the probe comprising: an antenna for detecting radio frequency (RF) activity of one or more RF sources in a network;
one or more processors;
a memory unit coupled to the one or more processors, the memory unit including:
a channel scanner operatively connected to the antenna, the channel scanner executable by the one or more processors to generate a filtered signal based on a desired bandwidth range;
a spectrum analyzer executable by the one or more processors to determine a spectral content of the filtered signal and calculate a frequency spectrum of the filtered signal;
a spectrum reporting agent executable by the one or more processors to transmit the spectral content and the frequency spectrum upon receiving a request for a spectrum report from the server and communicate via the server the spectrum report comprising the spectral content and the frequency spectrum to a client device configured to execute a software application;
a TV channel media decoder module executable by the one or more processors, the TV channel media decoder module configured to capture a screenshot of a decoded stream of a broadcast program, wherein the decoded stream is based on the filtered signal; and
a picture collector of the server operatively connected to the TV channel media decoder module, the picture collector configured to request from the probe, the screenshot of the decoded stream of the broadcast program to identify a broadcaster of the broadcast program and determine whether the broadcaster is an authorized user of the desired bandwidth range.

17. The system of claim 16, wherein the memory unit further comprises a TV signal meter operatively connected to a TV signal reporting agent executable by the one or more processors, the TV signal reporting agent configured to report a measured strength of the filtered signal to the server.

18. The system of claim 16, wherein the memory unit further comprises location services executable by the one or more processors, the location services configured to determine a real-time location of the probe, wherein the real-time location of the probe is reported to the server.

19. The system of claim 16, wherein the memory unit further comprises a probe controller executable by the one or more processors, the probe controller configured to receive firmware updates over the air from an operation and maintenance module of the server.

20. The system of claim 17, the TV signal reporting agent operatively connected to a signal reporting collector of the server, the signal reporting collector configured to request from the probe, data comprising the measured strength of the filtered signal to determine whether the one or more RF sources is an authorized user of the desired bandwidth range.

* * * * *